Aug. 8, 1939.  G. M. E. POS  2,168,363
APPARATUS FOR MIXING FLUIDS
Filed Nov. 9, 1936
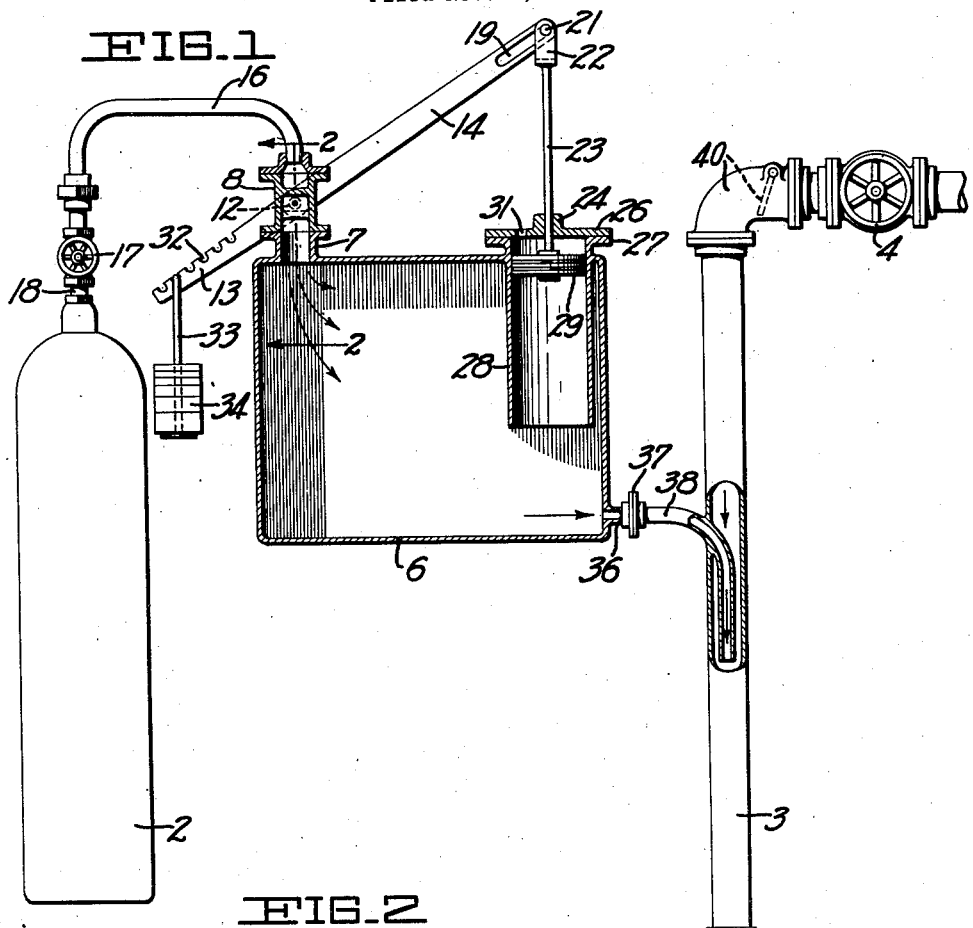
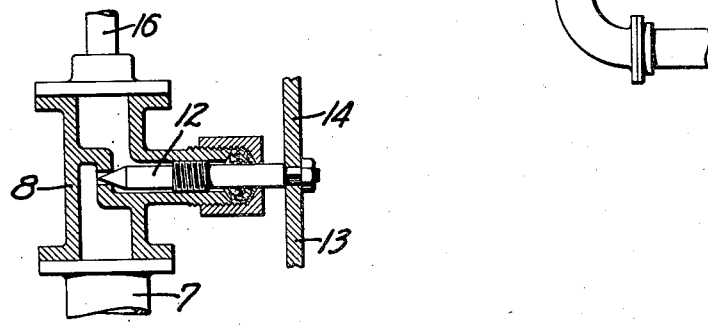
INVENTOR
Gerrit M. E. Pos
BY
Harry C. Schroeder
ATTORNEY Patented Aug. 8, 1939

2,168,363

UNITED STATES PATENT OFFICE 2,168,363

APPARATUS FOR MIXING FLUIDS

Gerrit M. E. Pos, Martinez, Calif.

Application November 9, 1936, Serial No. 109,972

2 Claims. (Cl. 210—28)

This invention relates to apparatus for continuously and automatically controlling the admixture of a fluid with another flowing fluid to provide a predetermined uniform solution of the fluids.

It is an object of the invention to provide, in apparatus of the character described, means whereby the quantity of fluid to be added is governed by the velocity of the flowing fluid so that regardless of the amount of solution required the desired proportions of the mixture will remain constantly adjusted.

Another object of the invention is to provide a simple and sturdy device, of the character referred to, which requires no careful adjustment or constant care to insure its efficient operation.

Still another object of the invention is to provide a closed system in which volatile fluids may be intermixed without the dissemination of obnoxious fumes.

The invention possesses other objects and valuable features, some of which, together with the foregoing, will be specifically set forth in the detailed description of the invention hereunto annexed. It is to be understood that the invention is not to be limited to the particular species thereof shown and described as various other embodiments thereof may be employed within the scope of the appended claims.

Referring to the drawing:

Figure 1 is a front elevational view, partly in section, of the apparatus of my invention.

Figure 2 is a vertical sectional view of the needle valve. The plane of section is indicated by the line 2—2 of Figure 1.

In detail, the numeral 2 indicates a drum in which is contained, under considerable pressure, a fluid which may be either in gaseous or liquid phase, and the numeral 3 indicates a pipe line through which a fluid, preferably water, is flowing, the rate of flow, and consequently the volume of water passing through the pipe, being controlled by the valve 4.

A closed tank 6 is provided having a flanged nipple 7 to which is bolted a needle valve 8, the rotary shaft 12 of which is fixed to an actuating member comprising a pair of oppositely extending arms 13 and 14. A conduit 16 is bolted, at one end, to the valve 8, and at the other end is provided with a shut-off valve 17, also preferably a needle valve, a nipple 18 connecting this valve with the container 2.

The distal end of the arm 14 is provided with a slot 19 in which is slidably disposed the pin 21 fixed in clevis 22 carried on the upper end of a piston rod 23 slidably journaled in the central boss 24, formed in the flange 26 which is bolted to the flange 27, provided at the upper end of a cylinder 28 welded into the side wall of the tank 6 and whose lower open end terminates within the tank. A piston 29 mounted on the lower end of the piston rod 23 is slidable axially of the cylinder and to permit the entrance and exit of air into the space between the piston and the flange 26, during the strokes of the piston, a vent orifice 31 is provided in the flange. The outer end of the arm 13 is provided with spaced notches 32 in any of which may be placed a yoke 33 carrying weights 34.

A nipple 36 is provided, opening into the tank 6 adjacent the bottom thereof, and attached to the nipple, by means of the flanged coupling 37, is a conduit 38 entering the pipe line 3 through the side wall thereof and extending axially thereof in the direction of the flow of water therethrough.

In operation, the drum 2 is attached to the nipple 18 and the valve 17 is opened, thereby filling the conduit 16 with the fluid contained in the drum; the fluid being incapable of escaping into the tank 6 since the valve 8 is closed due to the over-balancing weights maintaining the valve actuating member in the position shown in the Figure 1. The water valve 4 is now opened as wide as necessary to provide the desired flow of water through the pipe 3. As the water flows past the orifice of the conduit 38 a suction is created in the latter which creates a vacuum in the tank 6, whereupon the piston 29 will be drawn downwardly in the cylinder 28 thereby opening the valve 8 and allowing the fluid contained under pressure in the conduit 16 to flow into the tank and outwardly therefrom, through the conduit 38 to be mixed with the water stream. Should it be desired to increase the volume of water flowing in the pipe 3 the valve 4 may be opened further whereupon the increased suction created in the conduit 38 will cause an increase in the vacuum within the tank 6 which will move the piston 29 further downwardly in the cylinder and open the valve 8 a corresponding amount, thereby allowing more fluid to pass into the tank from the drum 2 to compensate for the increased volume of water flowing in the pipe 3. Conversely, partial closing of the water valve 4, will, by the decreased flow of water, cause the vacuum in the tank 6 to decrease and act upon the piston 29 to correspondingly close the valve 8. The degree of response of the actuating mechanism for the valve 8 may be controlled by adding or removing counterweights 34, or by shifting the yoke 33 into one of any of the notches 32 toward or away from the rotational axis of the valve shaft 12.

Frequently the apparatus is attached to the mains supplying drinking water to neighboring households, and to prevent any of the chemically treated water from backing up in the mains to the faucets, or other service taps, I provide a check valve 40 in the conduit 3 through which the water is flowing. This check valve will permit flow of the water through the conduit only in the direction indicated by the arrows in Figure 1.

The apparatus of my invention, just described, is particularly suited for mixing, in the desired predetermined proportions, chemicals to water which is to be used in fertilizing plants or orchards or for insecticidal purposes. It will be seen that the apparatus requires no adjustments other than the regulation of the weights 34 to govern the quantity of chemical added to the water, and when this has once been set no additional attention is required. It will be observed also that the use of the apparatus may be entrusted to the ordinary unskilled laborer without fear that it will be misused or get out of order.

I claim:

1. The combination with a pipe through which water is flowing, of a tank, a cylinder opening into said tank, a piston slidable in said cylinder for varying the volume of said tank, a conduit connected at one end to said tank and at the other end to said pipe in such a manner that a flow of water through said pipe will induce a flow through the conduit in proportion to the rate of water flow, thereby creating reduced pressures in the tank and causing the piston to move in one direction, a weight for moving the piston in the other direction, a drum containing fluid to be mixed with the water, a duct leading from the drum to the tank, a valve in the duct, and means connecting the valve with the piston for opening and closing the valves in accordance with the movements of the piston.

2. The combination with a pipe having water flowing therethrough, of a conduit so connected to the pipe that the flow of water through the pipe will induce a flow through the conduit, a tank communicating with the conduit, a cylinder opening into the tank, a piston slidable in the cylinder and being subjected to tank pressures on one side and atmospheric pressures on the other, a source of fluid supply, a conduit leading from the source to the tank, a valve in the second conduit, a lever operatively connected to the valve and to the piston for opening the valve in direct proportion to the movement of the piston toward the inner end of the cylinder, and an adjustable weight for urging the piston toward the outer end of the cylinder for closing the valve.

GERRIT M. E. POS.